(12) United States Patent
Reiss et al.

(10) Patent No.: US 11,504,979 B2
(45) Date of Patent: Nov. 22, 2022

(54) LABEL PRINTER

(71) Applicant: Bizerba SE & Co. KG, Balingen (DE)

(72) Inventors: Rafael Reiss, Balingen (DE); Holger Offermann, Messstetten (DE)

(73) Assignee: Bizerba SE & Co. KG, Balingen (DE)

( * ) Notice: Subject to any disclaimer, the term of this patent is extended or adjusted under 35 U.S.C. 154(b) by 0 days.

(21) Appl. No.: 17/127,374

(22) Filed: Dec. 18, 2020

(65) Prior Publication Data

US 2021/0187966 A1 Jun. 24, 2021

(30) Foreign Application Priority Data

Dec. 18, 2019 (EP) ..................................... 19217599

(51) Int. Cl.
| | |
|---|---|
| *B41J 3/407* | (2006.01) |
| *B41J 2/325* | (2006.01) |
| *B41J 15/04* | (2006.01) |

(52) U.S. Cl.
CPC ............. *B41J 3/4075* (2013.01); *B41J 2/325* (2013.01); *B41J 15/042* (2013.01)

(58) Field of Classification Search
CPC ........ B41J 15/04; B41J 3/4075; B41J 15/042; B41J 2/325
See application file for complete search history.

(56) References Cited

U.S. PATENT DOCUMENTS

| | | | | |
|---|---|---|---|---|
| 4,089,569 A | * | 5/1978 | Rempel | ................. F16C 27/066 |
| | | | | 384/536 |
| 4,527,472 A | * | 7/1985 | Davison | .................. B41F 13/22 |
| | | | | 101/219 |
| 4,716,718 A | | 1/1988 | Goebbels et al. | |

(Continued)

FOREIGN PATENT DOCUMENTS

| | | |
|---|---|---|
| DE | 10 2008 019 931 A1 | 10/2009 |
| EP | 1 497 136 B1 | 6/2011 |

(Continued)

OTHER PUBLICATIONS

European Search Report dated Apr. 29, 2020 in related European Patent Application No. 19217589.1 (three pages).

(Continued)

*Primary Examiner* — David H Banh
(74) *Attorney, Agent, or Firm* — Kilpatrick Townsend & Stockton LLP (57) ABSTRACT

Disclosed is a label printer, having a first receiver for a printhead; at least two mutually different printhead units, each configured as a replaceable module and that each have a printhead, wherein one of the two printhead units is selectively received by the first receiver in an assembled state; a second receiver for a guide unit for the carrier tape having a counter-element to the printhead that is configured to hold the carrier tape with the labels in contact with the printhead; and at least two mutually different guide units for the carrier tape, each configured as a replaceable module and that each have a counter-element to the printhead that is configured to hold the carrier tape with the labels in contact with the printhead, wherein one of the two guide units for the carrier tape is selectively received by the second receiver in the assembled state.

12 Claims, 9 Drawing Sheets

(56) References Cited

U.S. PATENT DOCUMENTS

| | | | |
|---|---|---|---|
| 5,295,753 A * | 3/1994 | Godo | B41J 3/4075 |
| | | | 156/277 |
| 6,049,347 A | 4/2000 | Ewert et al. | |
| 6,067,103 A | 5/2000 | Ewert et al. | |
| 10,124,922 B2 | 11/2018 | Pfeffer et al. | |
| 2003/0053835 A1* | 3/2003 | Bernhard | B41J 11/46 |
| | | | 400/615.2 |
| 2005/0024472 A1 | 2/2005 | Sautter | |
| 2006/0284963 A1* | 12/2006 | Nakatani | B41J 2/335 |
| | | | 347/171 |
| 2007/0231030 A1 | 10/2007 | Miyake et al. | |
| 2011/0109696 A1* | 5/2011 | Essen | B41J 25/304 |
| | | | 347/49 |
| 2012/0318459 A1 | 12/2012 | Kobayashi | |
| 2013/0108346 A1 | 5/2013 | Preliasco et al. | |
| 2013/0240593 A1 | 9/2013 | Maeyama | |
| 2014/0147186 A1 | 5/2014 | Uchino et al. | |
| 2016/0229207 A1 | 8/2016 | Perry et al. | |
| 2019/0299658 A1 | 10/2019 | Mizutani | |
| 2021/0187967 A1 | 6/2021 | Reiss et al. | |
| 2021/0187980 A1 | 6/2021 | Reiss et al. | |
| 2021/0187981 A1 | 6/2021 | Reiss et al. | |

FOREIGN PATENT DOCUMENTS

| | | |
|---|---|---|
| EP | 1 204 535 B2 | 7/2013 |
| EP | 3 401 110 A1 | 11/2018 |
| EP | 2 535 195 B1 | 7/2019 |
| WO | 01/83224 A1 | 11/2001 |
| WO | 2017/076533 A1 | 5/2017 |

OTHER PUBLICATIONS

European Search Report dated May 18, 2020 in related European Patent Application No. 19217599.0 (three pages).
European Search Report dated May 19, 2020 in related European Patent Application No. 19217609.7 (three pages).
European Search Report dated Apr. 28, 2020 in related European Patent Application No. 19217620.4 (three pages).
Non-Final Office Action dated Sep. 16, 2021 in related U.S. Appl. No. 17/127,517 (15 pages).
Notice of Allowance dated May 27, 2022 in related U.S. Appl. No. 17/127,517 (seven pages).
Notice of Allowance dated Jun. 29, 2022 in related U.S. Appl. No. 17/127,232 (12 pages).

* cited by examiner

LABEL PRINTER

This application claims priority to European Patent Application No. 19217599.0, filed Dec. 18, 2019, the disclosure of which is incorporated by reference herein.

The invention relates to a label printer for printing labels applied to a carrier tape, in particular wound onto a roll.

Label printers are used for labeling goods in the manufacturing industry and in logistics and in the food processing industry, in particular as part of a system for weight and price marking. The labels are in this respect typically applied to a carrier tape and are present in the form of a label roll. In the operation of the label printer, the labels are then led past a printhead by means of a carrier tape drawing roller and are printed. The labels are then removed from the carrier tape and are applied to the goods and the returning carrier tape can be wound up. A counter-element to the printhead is provided that is configured to hold the carrier tape with the labels in contact with the printhead.

Different types of label printers are known in this respect. For example, a label printer can be equipped with a thermal transfer printhead or with a direct thermal printhead. Furthermore, a label printer can be equipped with a counter-element in the form of a print roller or in the form of a mere sliding plate. When purchasing a new label printer, a decision must therefore be made in advance on which equipment the label printer is to have. If different equipment is then required, a further label printer having the different equipment has to be purchased or the present label printer has to be converted—if possible—in an expensive and/or complex manner.

It is the underlying object of the invention to provide a possibility of printing labels with different equipment in a cost-effective manner and simultaneously without complex and/or expensive conversions.

This object is satisfied by a label printer having the features of claim 1 and in particular in that the label printer comprises the following: a first receiver for a printhead unit having a printhead; at least two mutually different printhead units that are each configured as a replaceable module and that each have a printhead, wherein one of the two printhead units is selectively received by the first receiver in an assembled state; a second receiver for a guide unit for the carrier tape having a counter-element to the printhead that is configured to hold the carrier tape with the labels in contact with the printhead; and at least two mutually different guide units for the carrier tape that are each configured as a replaceable module and that each have a counter-element to the printhead that is configured to hold the carrier tape with the labels in contact with the printhead, wherein one of the two guide units for the carrier tape is selectively received by the second receiver in the assembled state.

The invention therefore provides that the respective printhead is part of a respective printhead unit configured as a replaceable module and the respective counter-element is part of a respective guide unit configured as a replaceable module. The respective printhead unit configured as a module forms a closed functional unit and the respective guide unit configured as a module forms a closed functional unit. The respective printhead unit can be removed as a whole from the label printer and can be replaced with a printhead unit of a different type in a fast and uncomplicated manner. The respective guide unit can also be removed as a whole from the label printer and can be replaced with a different type of guide unit in a fast and uncomplicated manner.

Thus, only a single label printer is also required for printing with different equipment and an expensive and/or complex conversion is also not required. The only requirement for this is that at least two mutually different printhead units and at least two mutually different guide units are present of which the currently required printhead unit or the currently required guide unit is then received by the first or second receiver. The label printer can thereby be flexibly used, which provides the user with a major advantage. Label printers in which the printhead units and the guide units are not configured as modules that can be quickly replaced cannot be flexibly used so that sooner or later they are configured in the wrong equipment.

A printhead unit having a thermal transfer printhead can in particular be replaced with a printhead unit having a direct thermal printhead, or vice versa, and a guide unit having a counter-element configured as a print roller can be replaced with a guide unit having a counter-element configured as a sliding plate, or vice versa.

The first and second receivers can each have a horizontally arranged holding mandrel that is in particular configured as a round bar, that is fastened with a respective one end to a support, in particular to a support plate, and whose other end projects from the support in a self-supporting manner, with the two printhead units each being able to be pushed from the self-supporting end onto the first receiver, and with the two guide units for the carrier tape each being able to be pushed from the self-supporting end onto the second receiver. A receiver configured in such a manner enables a particularly fast and particularly uncomplicated replacement of the printhead unit or of the guide unit.

The respective printhead unit can be fastened to the first receiver by means of a screw that can be loosened by hand, in particular a knurled screw, and/or the respective guide unit can be fastened to the second receiver by means of a screw that can be loosened by hand, in particular a knurled screw. The printhead unit and the guide unit can be particularly simply held at the respective receiver by means of the screws that can be loosened by hand.

It is preferred if the respective printhead unit can be received by the first receiver irrespectively of whether the respective guide unit for the carrier tape is already received by the second receiver and if the respective guide unit for the carrier tape can be received by the second receiver irrespectively of whether the respective printhead unit is already received by the first receiver. An unimpeded replacement of the respective printhead unit and/or of the respective guide unit is thus ensured at all times.

Provision is made in accordance with an embodiment of the invention that, in the assembled state, the respective printhead unit is pivotably supported about the first receiver between an operating position and an insertion position for a thermal transfer tape; and/or that, in the assembled state, the respective guide unit for the carrier tape is pivotably supported about the second receiver between an operating position and an insertion position for the carrier tape. The insertion of the thermal transfer tape and/or of the carrier tape is facilitated in this manner.

The invention further relates to a set of mutually different accessory parts for the same label printer that is configured to print labels applied to a carrier tape, in particular wound onto a roll, wherein the accessory parts comprise at least two printhead units that each have a printhead; and/or at least two guide units for the carrier tape that each have a counter-element to a printhead that is configured to hold the carrier tape with the labels in contact with the printhead, with the accessory parts each being configured as a replaceable module. The same advantages can hereby be achieved as by the above-described label printer in accordance with the invention.

Provision can be made that the printhead units comprise a first and a second printhead unit, with the printheads of the first and second printhead units being different from one another; and/or that the guide units comprise a first and a second guide unit, with the counter-elements of the first and second guide units being different from one another. Different printing constellations can thereby be realized by the label printer. Both the first printhead unit and the second printhead unit can in particular be combined with each of the two guide units so that a total of four different printing constellations are then possible.

The printhead of the first printhead unit can be configured as a thermal transfer printhead and the printhead of the second printhead unit can be configured as a direct thermal printhead. A thermal transfer printhead can print labels both in the thermal transfer printing process (with the additional use of a thermal transfer tape) and in the direct thermal printing process. In the case of thermal transfer printing, the labels take up the ink, in particular the black ink, of the thermal transfer tape or ink ribbon so that the prints are particularly durable. Ink ribbons are in contrast not required for direct thermal printers so that it is possible to print more cost-effectively and faster.

The counter-element of the first guide unit can be configured as a driven print roller and the counter-element of the second guide unit can in particular be configured as a sliding plate that is in particular metallic and/or that is provided with a damping element, in particular with a felt. A print roller can be manufactured in a durable and favorable manner. Due to its diameter, a print roller, however, requires a certain spacing between the print region and a dispensing edge or peel-off edge of the label printer arranged directly downstream. It is then possible in this respect that, on the release of a previous label at the dispensing edge, a following label has already partly passed through the print region so that a so-called near-edge print at the front label edge is not possible without further measures. To prevent this, either the carrier tape has to be briefly reversed, whereby a loss of speed occurs and the throughput of printed labels thereby falls, or the labels have to be arranged at a larger spacing from one another, which is associated with higher costs. If the counter-element is configured as a sliding plate, the spacing between the print region and the dispensing edge can be smaller so that a near-edge print is possible without further measures having to be taken. However, such a counter-element is expensive and is in particular less durable with a damping element so that it has to be regularly replaced. The damping element can be provided to compensate tolerances of the sliding plate and/or of the printhead and/or to avoid damage to the printhead on the lowering in the direction of the sliding plate. With respect to this, a print roller can either be spring-supported and/or can be produced from a correspondingly yielding material, in particular plastic.

Advantageous embodiments of the invention are also described in the dependent claims, in the description, and in the drawings.

The invention will be described in the following by way of example with reference to the drawings. There are shown.

Figure 1:
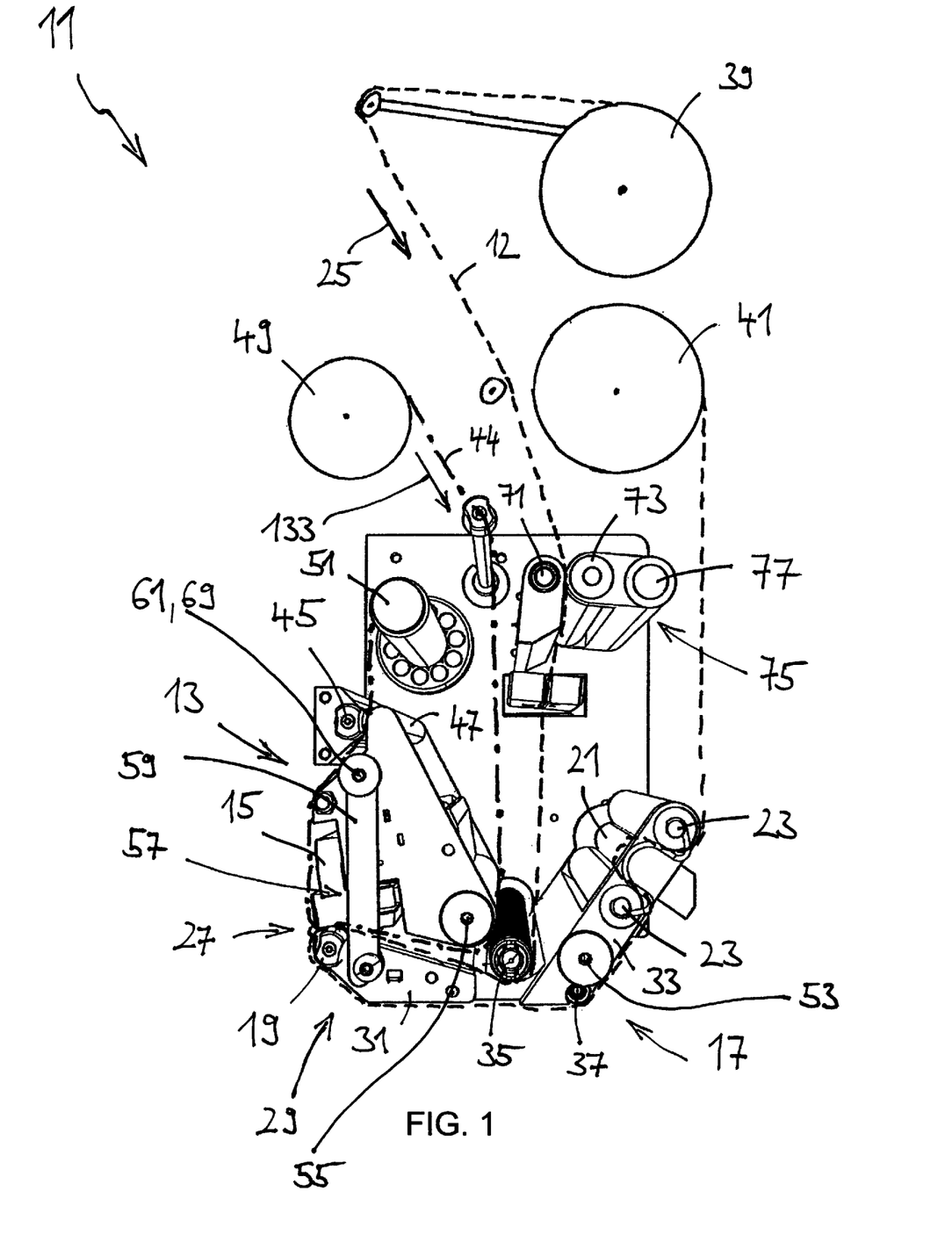
FIG. 1 a label printer in accordance with the invention for printing labels applied to a carrier tape in accordance with a first embodiment with a printhead unit, a guide unit for the carrier tape, and a high-speed drive that are each located in an operating position.

The label printer 11 shown in FIG. 1 for printing labels applied to a carrier tape 12 and wound onto a roll comprises a printhead unit 13 having a printhead 15; and a guide unit 17 for the carrier tape 12 that has a counter-element 19 to the printhead 15. The carrier tape 12 with the labels is led between the printhead 15 and the counter-element 19 in the operation of the label printer 11. The counter-element 19 is provided to hold the carrier tape 12 with the labels in contact with the printhead 15 to ensure the printing of the labels.

Furthermore, the label printer 11 comprises a drive mechanism for the carrier tape 12 having a driven carrier tape drawing roller 21 which is supported in a fixed position and with which two non-driven carrier tape pressure rollers 23 are associated that are each a part of the guide unit 17. The carrier tape drawing roller 21 and the two carrier tape pressure rollers 23 are provided to transport the carrier tape 12 along a predefined carrier tape transport path. For this purpose, the carrier tape 12 is led between the carrier tape drawing roller 21 and the respective carrier tape pressure roller 23. The two carrier tape pressure rollers 23 in this respect press the carrier tape 12 against the carrier tape drawing roller 21 in each case so that a sufficient pressing and propulsion force is generated onto the carrier tape 12. The carrier tape 12 is unwound from a label roll 39 and is wound by a driven carrier tape take-up roller 41 that is supported in a fixed position.

Specifically, an intermediate space is formed between the two carrier tape pressure rollers 23, into which intermediate space the carrier tape drawing roller 21 engages so that the carrier tape transport path extends in a respective S shape between the carrier tape drawing roller 21 and the respective carrier tape pressure roller 23 so that a double S-shaped curve of the carrier tape transport path results overall in this region. In this respect, viewed in the transport direction 25 of the carrier tape 12, the carrier tape drawing roller 21 and the two carrier tape pressure rollers 23 are arranged behind the printhead 15 and the counter-element 19 and are arranged behind a dispensing edge 27 arranged directly after the printhead 15 and the counter-element 19.

The guide unit 17 comprises an angular element 29 that has a horizontally oriented first angular arm 31 and a second angular arm 33 oriented obliquely upwardly. The counter-element 19 is in this respect arranged at the first angular arm 31 and the two carrier tape pressure rollers 23 are arranged at the second angular arm 33. The angle included by the two angular arms 31, 33 has a value of approximately 130°. To adapt the carrier tape transport path to the angular design of the angular element 29, the guide unit 17 further comprises a deflection roller 35 that is arranged inwardly disposed at the vertex of the angular element 29; and a further deflection roller 37 that is arranged outwardly disposed at the vertex of the angular element 29.

The label printer 11 shown in FIG. 1 is configured as a thermal transfer label printer, i.e. the printhead 15 is a thermal transfer printhead. The label printer 11 thus also has a drive mechanism for a thermal transfer tape 44 wound onto a roll. The drive mechanism for the thermal transfer tape 44 comprises a driven thermal transfer tape drawing roller 45 which is supported in a fixed position and with which a non-driven thermal transfer tape pressure roller 47 is associated that is a part of the printhead unit 13. The thermal transfer tape pressure roller 47 presses the thermal transfer tape 44 against the thermal transfer tape drawing roller 45 so that a sufficient pressing and propulsion force is generated onto the thermal transfer tape 44. In the operation of the label printer 11, the thermal transfer tape 44 is transported along a predefined thermal transfer tape transport path and is in this respect led between the printhead 15 and the counter-element 19, on the one hand, and between the thermal transfer tape drawing roller 45 and the thermal transfer tape pressure roller 47, on the other hand. The thermal transfer tape 44 is unwound from a thermal transfer tape roll 49 and is wound by a driven thermal transfer tape take-up roller 51 supported in a fixed position. Viewed in the transport direction 133 of the thermal transfer tape 44, the thermal transfer tape drawing roller 45 and the thermal transfer tape pressure roller 47 are arranged after the printhead 15 and the counter-element 19.

As can be recognized from FIG. 1, a change of the label roll 39 is time-consuming in the operating position of the guide unit 17 shown in FIG. 1 since the carrier tape 12 of the new label roll has to be laboriously threaded in between the printhead 15 and the counter-element 19, on the one hand, and between the carrier tape drawing roller 21 and the respective carrier tape pressure roller 23, on the other hand, since the spacing between the printhead 15 and the counter-element 19, on the one hand, and the spacing between the carrier tape drawing roller 21 and each of the two carrier tape pressure rollers 23, on the other hand, are at least not sufficiently large.

Figure 2:
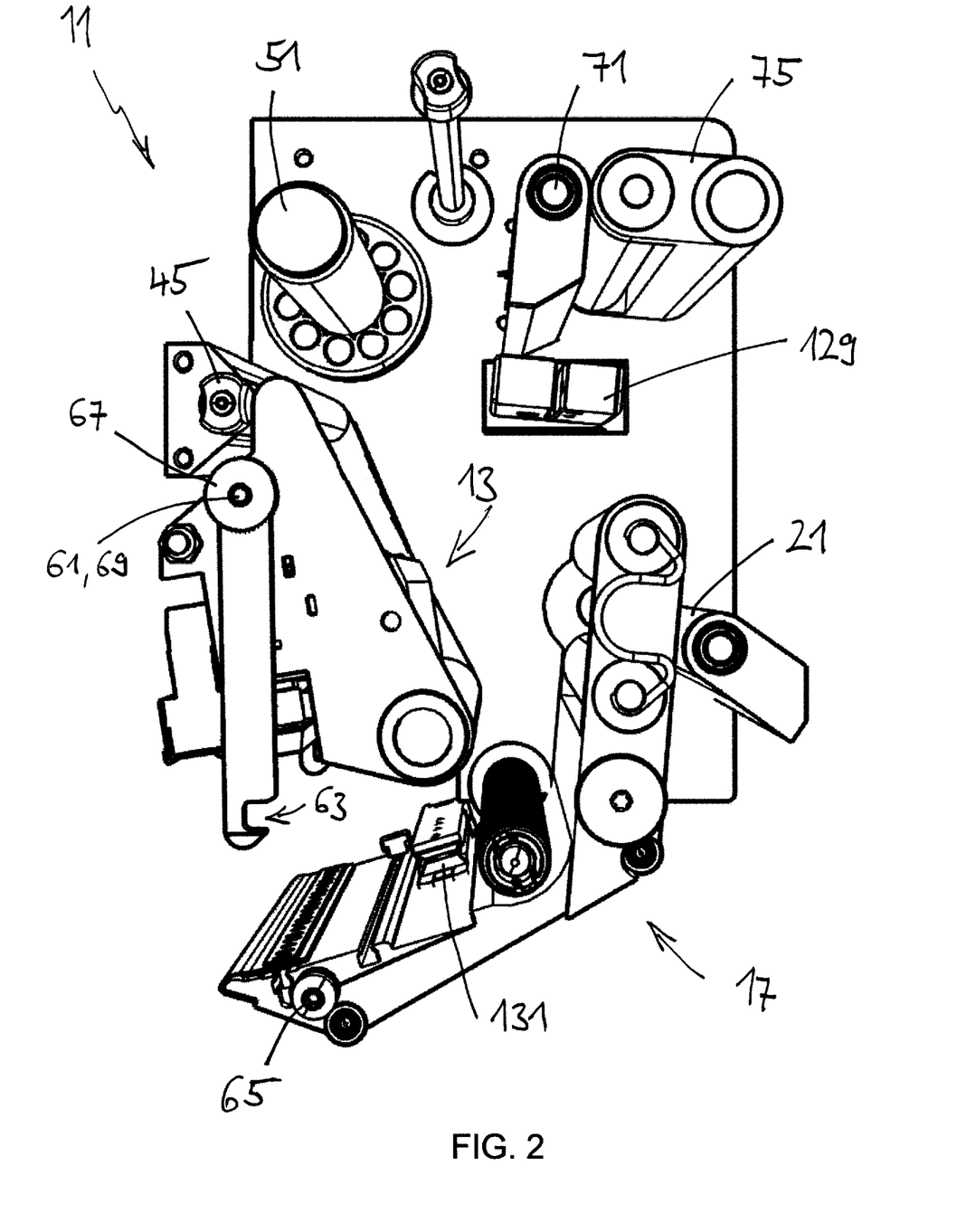
FIG. 2 a label printer in accordance with the invention in accordance with a second embodiment with an alternative guide unit that is located in an insertion position for the carrier tape.
Figure 3:
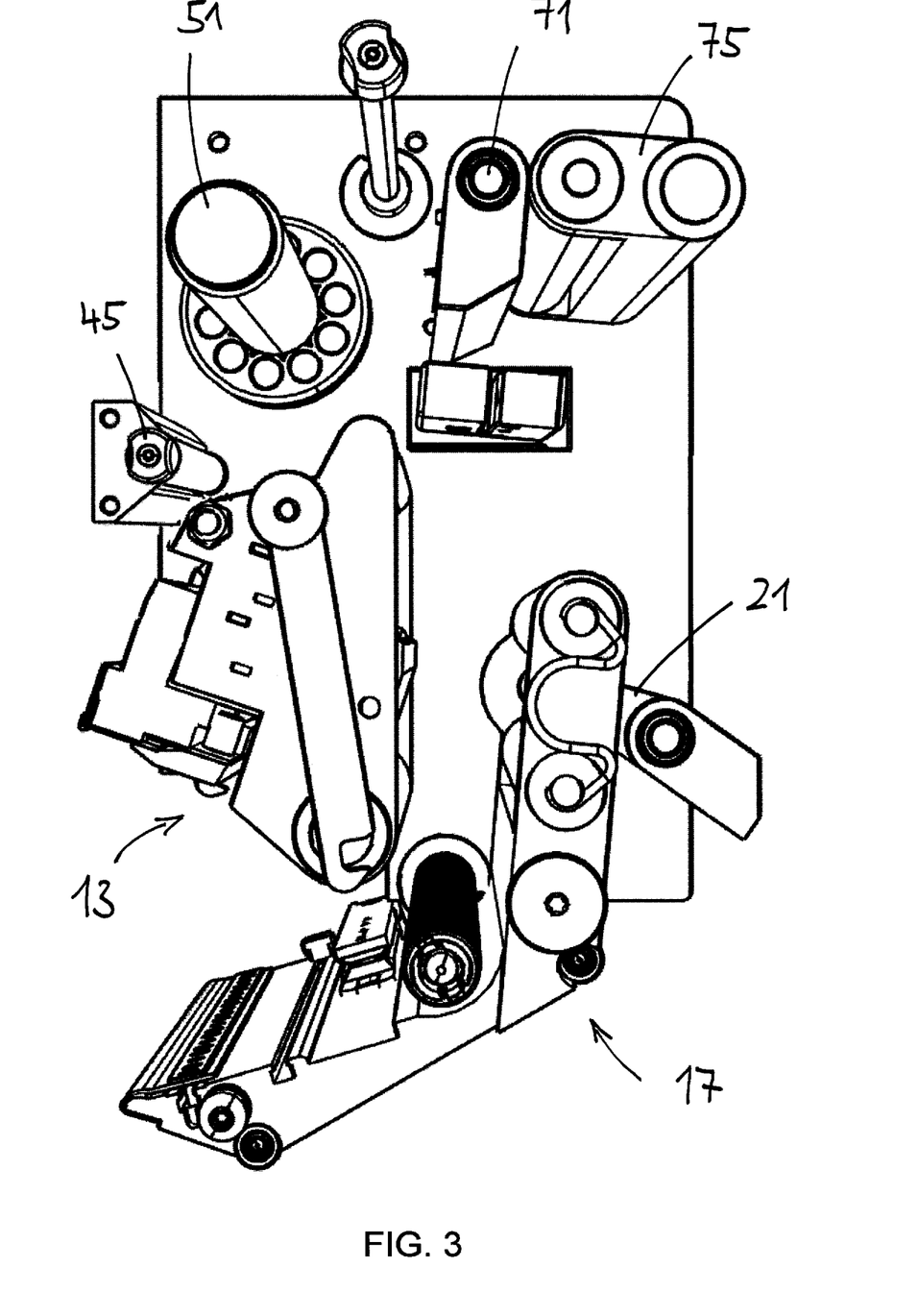
FIG. 3 the label printer from FIG. 2, with the printhead unit additionally being located in an insertion position for a thermal transfer tape.
Figure 4:
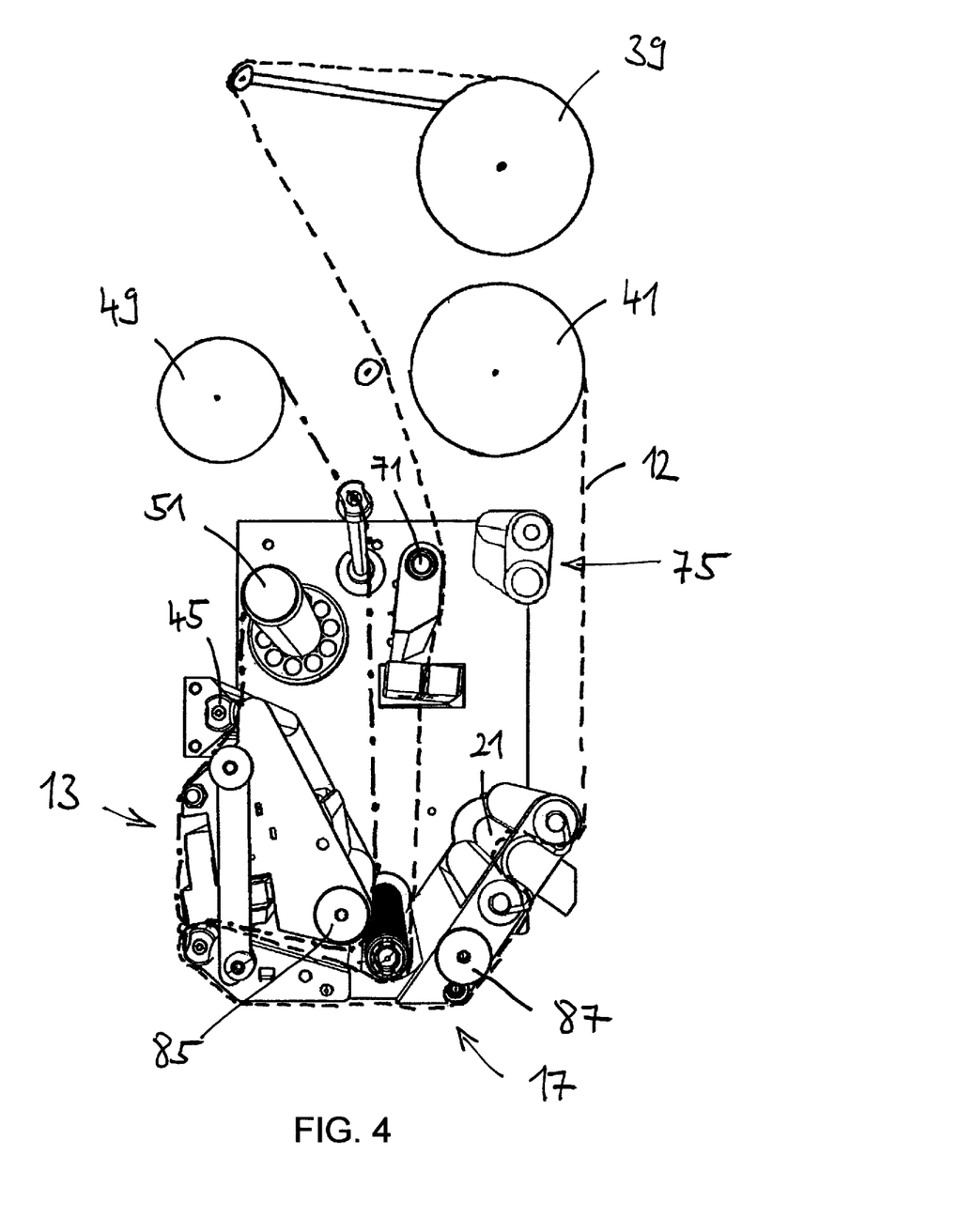
FIG. 4 the label printer from FIG. 1, with the high-speed drive being located in an insertion position for the carrier tape.

Therefore, the guide unit 17 can be pivoted counter-clockwise from its operating position shown in FIGS. 1 and 4 into its insertion position for the carrier tape 12 shown in FIGS. 2 and 3. For this purpose, the guide unit 17, in particular the angular element 29, is pivotably supported about a pivot axle 53. In the insertion position of the guide unit 17, the counter-element 19 is pivoted away from the printhead 15 and the two carrier tape pressure rollers 23 are pivoted away from the carrier tape drawing roller 21 so that the spacing between the counter-element 19 and the printhead 15 and the spacing between the two carrier tape pressure rollers 23 and the carrier tape drawing roller 21 increase. In the insertion position of the guide unit 17, the carrier tape drawing roller 21 is—viewed relatively—in particular completely withdrawn from the intermediate space formed between the two carrier tape pressure rollers 23. The carrier tape 12 of the new carrier tape roll can then be simply inserted.

The same applies to a change of the thermal transfer tape roll 49. This change is also time-consuming in the operating position of the printhead unit 13 shown in FIGS. 1, 2, and 4 since the thermal transfer tape 44 of the new thermal transfer tape roll has to be laboriously threaded between the thermal transfer tape drawing roller 45 and the thermal transfer tape pressure roller 47 since the spacing between the thermal transfer tape drawing roller 45 and the thermal transfer tape pressure roller 47 is at least not sufficiently large.

Therefore, the printhead unit 13 can also be pivoted clockwise from its operating position shown in FIGS. 1, 2, and 4 into its insertion position for the thermal transfer tape 44 shown in FIG. 3. For this purpose, the printhead unit 13 is pivotably supported about a printhead unit pivot axle 55. In the insertion position of the printhead unit 13, the thermal transfer tape pressure roller 47 is pivoted away from the thermal transfer tape drawing roller 45 so that the spacing between the thermal transfer tape pressure roller 47 and the thermal transfer tape drawing roller 45 increases. The thermal transfer tape 44 of the new thermal transfer tape roll can then be simply inserted.

The insertion of the thermal transfer tape 44 in the region of the printhead 15 and of the counter-element 19 in this respect does not cause any difficulties since the printhead 15 and the counter-element 19 already adopt a sufficiently large spacing from one another due to the pivoting of the guide unit 17. However, this can generally also be provided in a different manner. To then be able to easily insert the thermal transfer tape 44 in the region of the printhead 15 and of the counter-element 19, the pivoting of the printhead unit 13 should then preferably take place such that the printhead 15 is pivoted away from the counter-element 19 as is also the case in the embodiments shown in the Figures.

Furthermore, a holding device 57 is provided that either holds the guide unit 17 in the operating position, i.e. secures it against a pivoting into the insertion position, or releases it for a pivoting into the insertion position. The holding device 57 comprises a lever 59 that is supported at the printhead unit 13 and that is rotatable about an axle 61 between a holding position and a release position. In the holding position, the guide unit 17 is secured in the operating position; in the release position, which the lever 59 reaches by a clockwise pivoting, the guide unit 17 is released for a pivoting into the insertion position.

The lever 59 has a recess 63 at its free end and the guide unit 17 has a projecting mushroom-shaped pin 65 (cf. FIG. 2). If the guide unit 17 is located in its operating position and the lever 59 is located in its holding position, the lever 59 hooks with the recess 63 into the pin 65 of the guide unit 17. The guide unit 17 can thereby be held in its operating position. A pivoting into its insertion position is then not possible. A knurled screw 67 (cf. FIG. 2), which can be actuated by hand, is provided to fix the lever 59 in its holding position. The axis of the knurled screw 67 in this respect coincides with the axle 61 of the lever 59.

Furthermore, a fixing device is provided in the form of a blocking pin 69 (cf. FIG. 2) which can be actuated by hand, which forms the axle 61 of the lever 59, and by which the printhead unit 13 can be fixed in its operating position. Thus, the printhead unit 13 can also be secured in its operating position by a technical measure. The blocking pin 69 is adjustable along its longitudinal axis between a blocking position and an unblocking position. In the blocking position, the blocking pin 69 engages into a blocking opening 139 formed in a support 79 of the label printer 11 set up on edge (cf. FIG. 5) so that a pivoting of the printhead unit 13 is prevented. If the blocking pin 69 is in contrast adjusted, in particular pulled, to the front into its unblocking position along its longitudinal axis against the preload of a spring, not shown, the printhead unit 13 is released. The printhead unit 13 can then be pivoted into its insertion position.

Furthermore, the drive mechanism for the carrier tape 12 comprises a further driven carrier tape drawing roller 71 supported in a fixed position; and a non-driven further carrier tape pressure roller 73 associated with the further carrier tape drawing roller 71, said further driven carrier tape drawing roller 71 and said non-driven further carrier tape pressure roller 73, viewed in the transport direction of the carrier tape 12, being arranged in front of the printhead 15 and the counter-element 19. The further carrier tape pressure roller 73 in this respect presses the carrier tape 12 against the further carrier tape drawing roller 71 so that a pressing and propulsion force is generated onto the carrier tape 44.

Since the further carrier tape drawing roller 71 and the further carrier tape pressure roller 73 are connected upstream of the printhead 15 and the counter-element 19, the carrier tape 12 can be transported along the carrier tape transport path at a higher speed than would be the case without the further carrier tape drawing roller 71 and without the further carrier tape pressure roller 73. The further carrier tape drawing roller 71 and the further carrier tape pressure roller 73 are namely disposed more closely to the label roll 39 than the carrier tape drawing roller 21 and the carrier tape pressure rollers 23 and can therefore pull the carrier tape 12 off from the label roll 39 more easily. No force in particular has to be applied on the pulling off for the sharp deflection of the carrier tape 12 at the dispensing edge 27. The label throughput can thereby be increased.

In order not to have to laboriously thread in the carrier tape 12 between the further carrier tape drawing roller 71 and the further carrier tape pressure roller 73 on a change of the label roll 39, the further carrier tape pressure roller 73 is a part of a pivot element 75 that is pivotably supported about a further pivot axle 77 between an operating position (cf. FIGS. 1 to 3) and an insertion position for the carrier tape 12 (cf. FIG. 4). Analogously to the situation described above with respect to the pivotable guide unit 17, to the carrier tape drawing roller 21 and to the carrier tape pressure rollers 23, in the operating position of the pivot element 75, the carrier tape 12 can be led between the further carrier tape drawing roller 71 and the further carrier tape pressure roller 73 and can be transported along the carrier tape transport path and, in the insertion position for the carrier tape 12, the further carrier tape pressure roller 73 is pivoted away from the further carrier tape drawing roller 71.

The pivot element 75 is pivoted upwardly from the operating position shown in FIGS. 1 to 3 to "open" the carrier tape transport path and is pivoted downwardly from the insertion position shown in FIG. 4 to "close" the carrier tape transport path. The carrier tape 12 is transported downwardly by the further carrier tape drawing roller 71 rotating clockwise, as is shown in FIG. 1 with reference to the transport direction 25 of the carrier tape 12. The sense of rotation of the pivot movement of the pivot element 75 from the insertion position into the operating position is therefore opposite to the sense of rotation of the further carrier tape drawing roller 71. This ultimately means that, in the operation of the label printer 11, the carrier tape 12 pulls the pivot element 75 in the direction of the operating position and thus counteracts a pivoting in the direction of the insertion position.

The pivot element 75 having the further carrier tape pressure roller 73 can be removable from the label printer 11 and the further carrier tape drawing roller 71 can be mechanically decoupled from its motor and can be usable as a mere deflection roller. The label printer 11 can then be converted to a version without the further drive. Alternatively, the version without the further drive can also already be offered ex works. In both cases, it is preferred if the label printer 11 has a first operating mode and a second operating mode. The first operating mode is selected if the further drive, i.e. the further carrier tape drawing roller 71 and the further carrier tape pressure roller 73, is present. This is then a case of a high-speed mode. The second operating mode is selected if the further drive is absent, i.e. if the further carrier tape pressure roller 73 is removed or is absent from the start and the further carrier tape drawing roller 71 is mechanically decoupled from an associated motor or the latter is absent from the start. This is then a case of a normal speed mode.

Furthermore, the label printer 11 can have an operating mode in which the printhead 15 is alternately adjusted between a position lowered onto the carrier tape 12 and a position raised from the carrier tape 12. In the lowered position, a label can be printed in the respective print region and the raised position is adopted between the printing of two consecutive labels in the respective print regions. In the regions in which the respective label is not printed, the printhead 15 can adopt the raised position. In this respect, the carrier tape drawing roller 21, the further carrier tape drawing roller 71 and the carrier tape take-up roller 41 are operated at a higher rotational speed in the raised position of the printhead 15 than in the lowered position of the printhead 15. For this purpose, the carrier tape 12 has to be alternately slowed down and accelerated between the printing of consecutive print regions. This can in particular be sensible when decorative labels are used that are not printed over large regions. Due to the provision of the further carrier tape drawing roller 71 and the further carrier tape pressure roller 73, the carrier tape 12 can be accelerated more than otherwise possible. The raising of the printhead 15 is in particular possible when a sliding plate 19" as explained in the following (cf. FIGS. 2, 3, and 8) is used as the counter-element 19.

Figure 5:
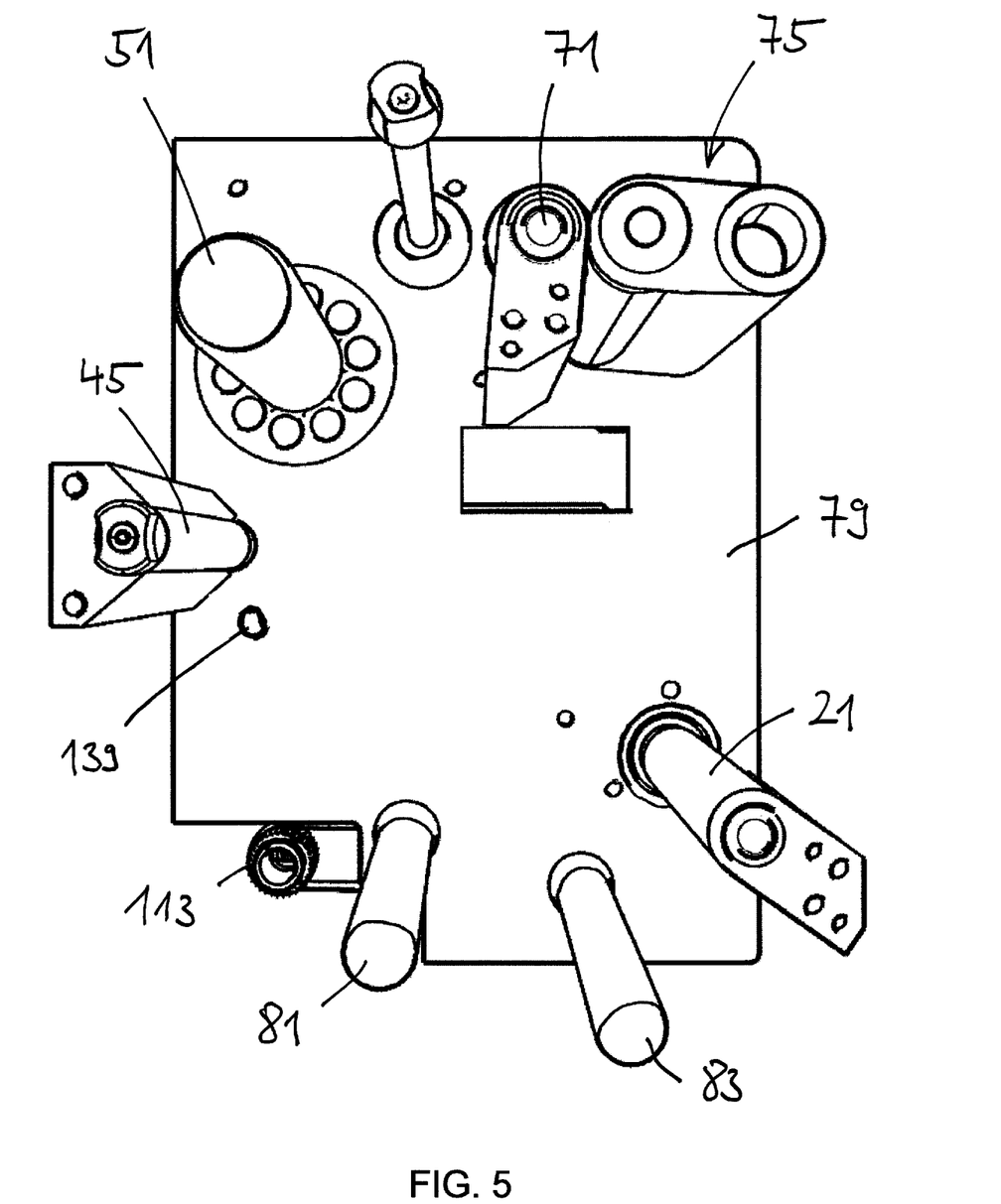
FIG. 5 the label printer from FIG. 1, with both the printhead unit and the guide unit being removed.

The printhead unit 13 and the guide unit 17 are each configured as a replaceable module and can each be removed from the label printer 11, as is shown in FIG. 5. For this purpose, a first receiver 81 for the printhead unit 13 and a second receiver 83 for the guide unit 17 project from the support plate 79. The two receivers 81, 83 are each configured as a horizontally oriented holding mandrel in the form of a round bar. The two receivers 81, 83 are fastened to the support plate 79 with the respective one end and the printhead unit 13 and the guide unit 17 can be pushed onto the receivers 81, 83 from the respective other, self-supporting end.

The printhead unit 13 can in this respect be received by the first receiver 81 irrespectively of whether the guide unit 17 is received by the second receiver 83 or is removed therefrom, and vice versa, i.e. the guide unit 17 can be received by the second receiver 83 irrespectively of whether the printhead unit 13 is received by the first receiver 81 or is removed therefrom. To fasten the printhead unit 13 or the guide unit 17 to the respective receiver 81, 83, a knurled screw 85, 87 is provided in each case (cf. FIG. 4) that can be loosened by hand so that the printhead unit 13 and the guide unit 17 are fastenable and removable in a fast and uncomplicated manner.

Figure 7:
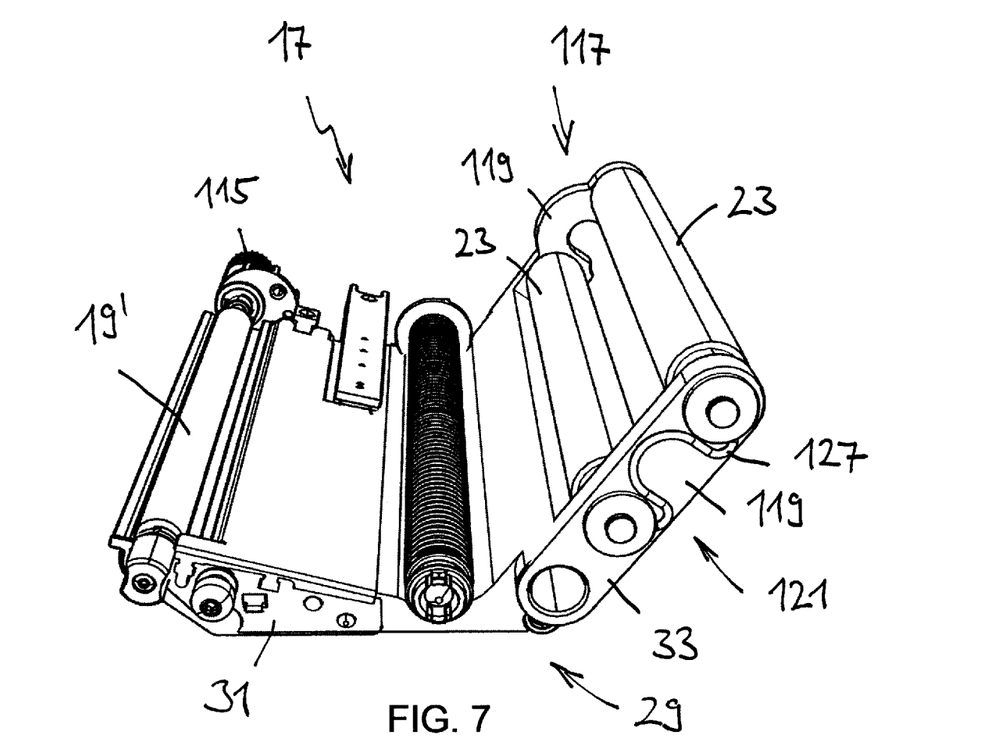
FIG. 7 the guide unit from FIG. 1 in an individual representation with two pressure rollers, an associated holder, and a spring device.
Figure 12:
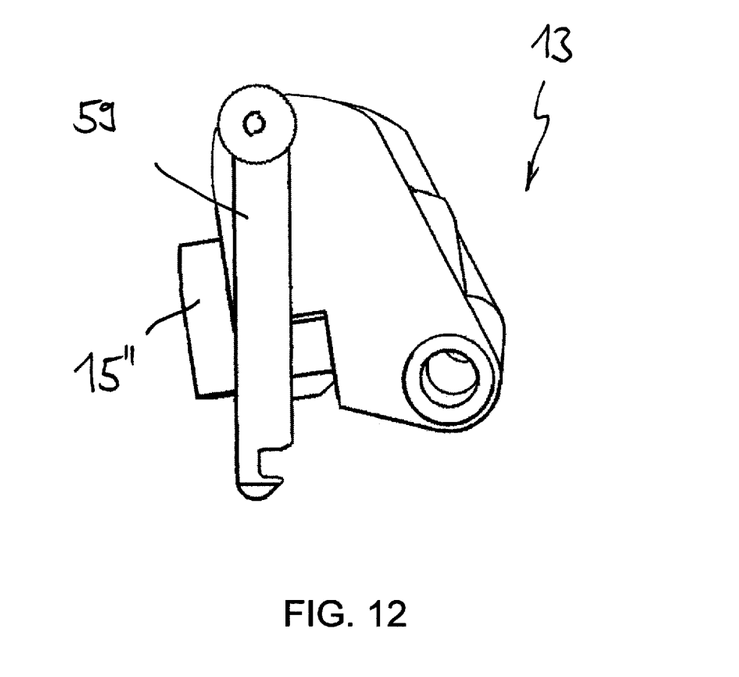
FIG. 12 an alternative printhead unit.

Two mutually different printhead units 13 and two mutually different guide units 17 are available for the label printer 11, wherein the label printer 11, in particular the two receivers 81, 83, receives one of the two printhead units 13 and one of the two guide units 17 in the assembled and operational state. The first of the two printhead units 13 has a printhead 15 that is configured as a thermal transfer printhead 15', as is shown in FIGS. 1 to 4, and 11. The second of the two printhead units 13 has a printhead 15 that is configured as a direct thermal printhead 15", as is shown in FIG. 12. The printhead unit 13 having the direct thermal printhead 15" does not have a thermal transfer tape pressure roller. The first of the two guide units 17 has, as the counter-element 19, a driven print roller 19', as is shown in FIGS. 1, 4, and 7. The second of the two guide units 17 has, as the counter-element 19, a sliding plate 19" provided with a damping element 89 and composed of metal, as is already mentioned above and is shown in FIGS. 2, 3, and 8. The damping element 89 is a felt that is between 0.5 mm and 1 mm thick and that is provided to compensate any tolerances of the sliding plate 19" and of the printhead 15 and to avoid damage to the printhead 15 on a lowering in the direction of the hard sliding plate 19". The damping element 89 is hot caulked with a plastic part 137 for the fixing.

The thermal transfer printhead 15' can be operated together with the thermal transfer tape 44 to print in the thermal transfer printing process. Such prints are particularly durable. However, the thermal transfer printhead 15' can generally also print in the direct thermal process, i.e. without the thermal transfer tape 44. The thermal transfer printhead 15' can thus be flexibly used, but is also expensive. The direct thermal printhead 15" can only print in the direct thermal process and is therefore more favorable. Due to its diameter, the print roller 19' is arranged at a specific spacing from the dispensing edge 27. Therefore, it is possible that a following label has already partly passed through beneath the printhead 15 at that point in time at which a previous label releases from the carrier tape 12 at the dispensing edge 27 so that a near-edge print at the front label edge is not possible without further measures. To prevent this, either the carrier tape has to be briefly reversed—with a loss of speed—or the labels have to be arranged at a larger spacing from one another—associated with higher costs. However, this problem that the printhead 15 is spaced too far apart from the dispensing edge 27 does not occur with the sliding plate 19" so that near-edge prints are easily possible here. However, the sliding plate 19" with the felt is less durable and is thus more expensive.

With the two mutually different printhead units 13 and the two mutually different guide units 17, a set of mutually different accessory parts for the label printer 11 is present. Thus, only a single label printer 11 is required for a printing with different equipment (thermal transfer printhead or direct thermal printhead, print roller or sliding plate). A total of four mutually different constellations are thus possible that can in particular be selectively used depending on the respective label type and/or on the desired printing. The label printer 11 can thus be flexibly configured.

The carrier tape take-up roller 41 is driven by a separate motor, not shown. The drive device of the remaining rollers 19', 21, 45, 51, 71 of the label printer 11 can in contrast be seen from FIG. 6 that shows a rear view of the support plate 79.

Figure 6:
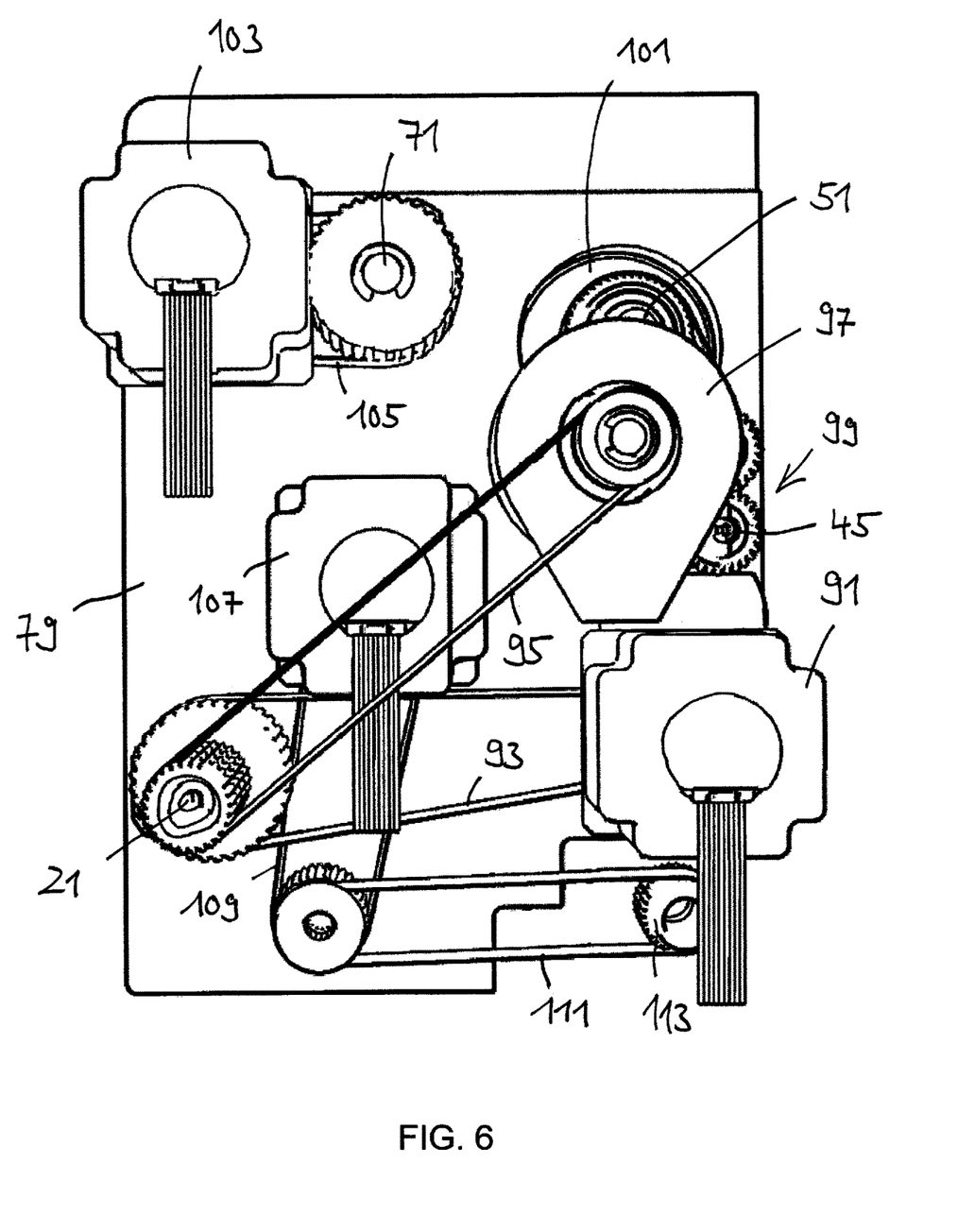
FIG. 6 a rear view of the label printer from FIG. 1 of the drive of the label printer.

The drive device first comprises a first motor 91 that drives the carrier tape drawing roller 21 via a toothed belt 93. The first motor 91 also drives the thermal transfer tape drawing roller 45 indirectly via the carrier tape drawing roller 21, a further toothed belt 95, a slip clutch 97, and a gear 99. Furthermore, the thermal transfer tape take-up roller 51 is also driven by the gear 99 while interposing a further slip clutch 101. The first motor 91 is therefore a common motor for the carrier tape drawing roller 21, the thermal transfer tape drawing roller 45, and the thermal transfer tape take-up roller 51 that are thus mechanically synchronized with one another.

Furthermore, the drive device comprises a second motor 103 that drives the further carrier tape drawing roller 71 via a further toothed belt 105 provided that the further drive having the further carrier tape drawing roller 71 and the further carrier tape pressure roller 73 is present; and a third motor 107 that drives the print roller 19' via two further toothed belts 109, 111 connected behind one another and two following toothed wheels 113, 115 engaging into one another provided that the guide unit 17 having the print roller 19' is used. The toothed wheel 113 is attached to the rear side of the support plate 79 (cf. FIGS. 5 and 6) and the toothed wheel 115 is attached to the guide unit 17 having the print roller 19' (cf. FIG. 7). If the further drive is not present, the second motor 103 can also be omitted. If the guide unit 17 having the sliding plate 19" is used, no toothed wheel 115 is provided (cf. FIG. 8).

The second motor 103 is a separate motor of the further carrier tape drawing roller 71 and the third motor 107 is a separate motor of the print roller 19'. Generally, a separate motor is a motor that drives only one roller. Thus, the carrier tape drawing roller 21, the further carrier tape drawing roller 71, the print roller 19', and the carrier tape take-up roller 41 are driven by motors 91, 103, 107 that are different from one another, but are electronically synchronized with one another by a corresponding regulation in order to ensure a mutually coordinated operation of the carrier tape drawing roller 21, the further carrier tape drawing roller 71, the print roller 19', and the carrier tape take-up roller 41.

Figure 8:
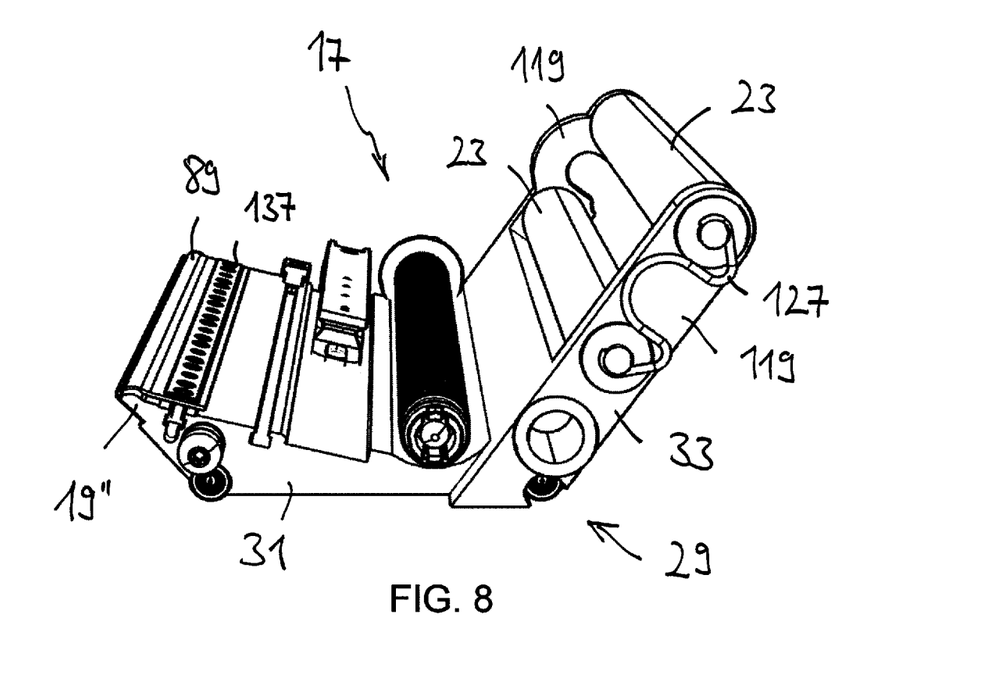
FIG. 8 the alternative guide unit from FIG. 2 in an individual representation with two pressure rollers, an associated holder, and a spring device.

The guide unit 17 having the print roller 19' is shown in FIG. 7 and the guide unit 17 having the sliding plate 19" is shown in FIG. 8. The second angular arm 33, identical in both cases, of the angular element 29 has a holder 117 having two holding arms 119 which are arranged in a fork-like manner and between which the two carrier tape pressure rollers 23 are each linearly displaceably supported with their two axial ends. In the operating position of the guide unit 17, the carrier tape drawing roller 21 is arranged between the two carrier tape pressure rollers 23. The carrier tape pressure rollers 23 are in this respect each displaceably supported perpendicular to their rotational axis, which in each case extends in parallel with the axis of rotation of the carrier tape drawing roller 21, and indeed in a displacement direction toward the carrier tape drawing roller 21 in the operating position of the guide unit 17.

Figure 9:
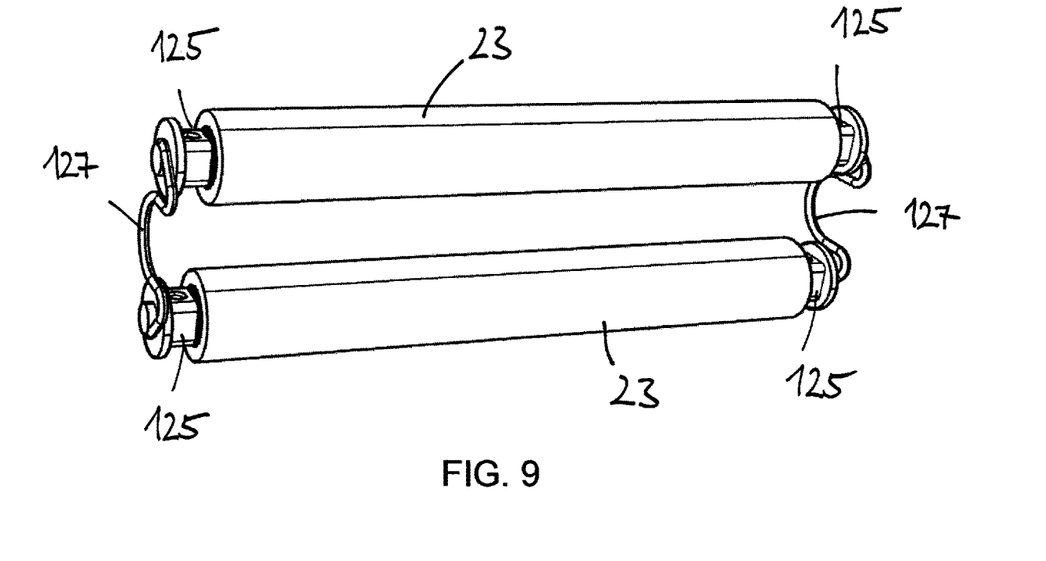
FIG. 9 the two pressure rollers and the spring device from FIG. 7 or FIG. 8.

To exert a pressing force onto the carrier tape 12 in the operating position of the guide unit 17, a spring device 121 is provided (cf. FIGS. 7 to 9) that preloads, in particular pulls, the two carrier tape pressure rollers 23 in their displacement direction in each case and thus toward one another. A particularly suitable pressing force, and thus propulsion force, can be automatically generated onto the carrier tape 12 by the spring device 121.

Figure 10:
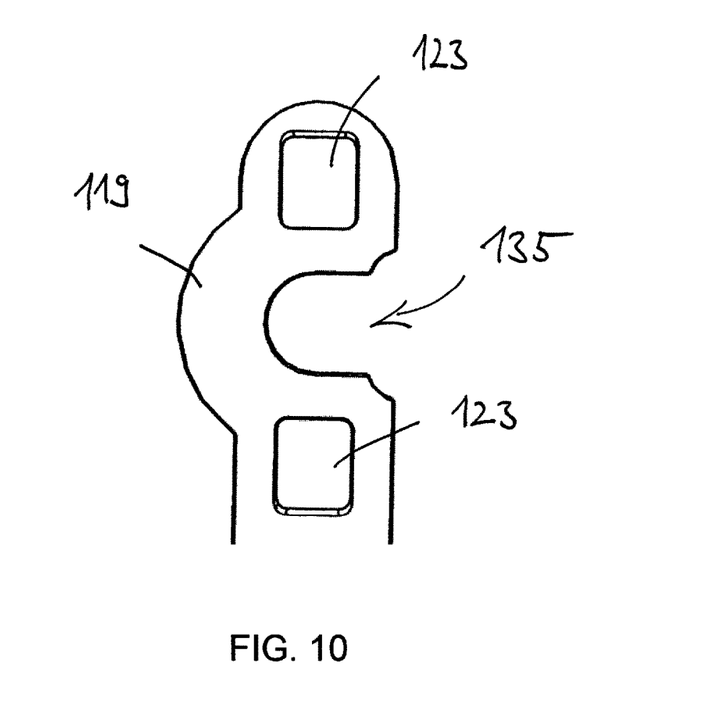
FIG. 10 a holding arm of the holder from FIG. 7 or FIG. 8.
Figure 11:
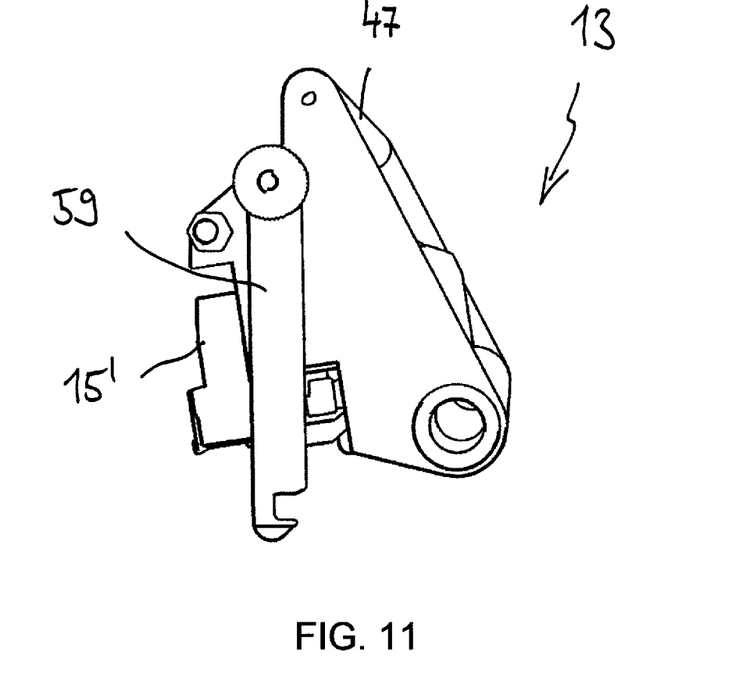
FIG. 11 the printhead unit from FIG. 1 or FIG. 2 in an individual representation.

In the two holding arms 119, of which the holding arm 119 that is the rear holding arm in FIGS. 7 and 8 is shown in FIG. 10, a respective two guide tracks 123 are provided that are each configured as a rectangular, straight slot. In the guide tracks 123 through which the holding arms 119 pass, the two carrier tape pressure rollers 23 are each displaceably guided with their two axial ends. For this purpose, the axial ends of the carrier tape pressure rollers 23 are each provided with a sliding block 125 (cf. FIG. 9) that is displaceably guided in the respective guide track 123. The holding arm 119 that is shown in FIG. 10 and that is the rear holding arm in FIGS. 7 and 8 has a cut-out 135 in comparison with the holding arm 119 that is the front holding arm in FIGS. 7 and 8 in order to enable an engaging through of the carrier tape drawing roller 21 in the operating position of the guide unit 17.

Specifically, the spring device 121 comprises two tension springs 127 that are each arranged outside the intermediate space formed between the two holding arms 119 and that are each arranged contacting one of the two holding arms 119. Only one of the two tension springs 127 can be recognized in FIGS. 7 and 8. The one of the two tension springs 127 in this respect engages at the one of the two axial ends of the one carrier tape pressure roller 23 and at the axial end of the other carrier tape pressure roller 23 disposed on the same side, and the other tension spring 127 engages at the other two axial ends. The tension springs 127 are in this respect each configured as an elongated bent wire part that extends in a plane and that is not wound, i.e. it has no windings. The respective tension spring 127 is formed as hook-shaped at its two wire ends so that it can be simply fastened to the two axial ends of the two carrier tape pressure rollers 23 disposed on the same side.

On the pivoting of the guide unit 17 from the insertion position shown in FIGS. 2 and 3 into the operating position shown in FIGS. 1 and 4, the two carrier tape pressure rollers 23 are pressed apart by the carrier tape drawing roller 21 and against the preload of the spring device 121, i.e. the spacing between the two carrier tape pressure rollers 23 increases. The operating position of the guide unit 17 can in this respect in particular be reached when the carrier tape drawing roller 21 is located approximately at the level of the straight connecting lines perpendicular to the two rotational axes of the two carrier tape pressure rollers 23 or it can already be reached beforehand. However, provision can also be made that the carrier tape drawing roller 21—viewed relatively—is pivoted beyond this straight connecting line into the intermediate space. The pivot movement of the guide unit 17 is then divided into a first phase, in which the carrier tape drawing roller 21 is pivoted—viewed relatively—up to the straight connecting lines, and into a second phase, which follows the first phase and in which the two carrier tape pressure rollers 23 are displaced toward one another again by the preloaded spring device 121, whereby the spacing between the two carrier tape pressure rollers 23 is reduced again. A kind of latching between the two carrier tape pressure rollers 23 and the carrier tape drawing roller 21 thus takes place, whereby the guide unit 17 can be held in the operating position.

Furthermore, the guide unit 17 comprises a sensor 129 for recognizing the labels, in particular an optical sensor, in particular a light barrier (cf. FIG. 2), that, viewed in the transport direction 25 of the carrier tape 12, is arranged between the further carrier tape drawing roller 71 and the further carrier tape pressure roller 73, on the one hand, and the printhead 15 and the counter-element 19, on the other hand. The label sensor 129 is provided to recognize the front edges of the labels in order to synchronize the drive of the carrier tape 12 with the control for the printhead 15. White labels, decorative labels, and transparent labels with black marks on the carrier tape 12 can in particular be detected by the label sensor 129.

In contrast, transparent labels that are applied to a carrier tape 12 without black marks cannot be recognized by the label sensor 129. To recognize such labels, a further sensor 131, namely an ultrasonic sensor, is provided (cf. FIG. 2) that, viewed in the transport direction 25 of the carrier tape 12, is arranged between the further carrier tape drawing roller 71 and the further carrier tape pressure roller 73, on the one hand, and between the printhead 15 and the counter-element 19, on the other hand.

For a change of the label roll 39, starting from the operating position of the label printer in FIG. 1, first the knurled screw 67 is loosened, then the lever 59 is pivoted clockwise into its release position to release the hook connection with the guide unit 17, and then the guide unit 15 is pivoted counterclockwise into its insertion position for the carrier tape 12. If the further drive having the further carrier tape drawing roller 71 and the further carrier tape pressure roller 73 is present, the pivot element 75 additionally has to be pivoted clockwise into its insertion position for the carrier tape 12. This can take place at any desired point in time. Subsequently, the used carrier tape 12 can be removed from the label printer 11 and the new carrier tape can be easily inserted or placed into the label printer 11 from the front.

For a change of the thermal transfer tape roll 49, the above-explained steps for a change of the label roll 39 are first performed, possibly with the exception of the pivoting of the optional pivot element 75. The blocking pin 69 is then pulled to the front and the printhead unit 13 can be pivoted clockwise into its insertion position for the thermal transfer tape 44. Subsequently, the used thermal transfer tape 44 can be removed from the label printer 11 and the new thermal transfer tape can be easily inserted or placed into the label printer 11 from the front.

For a change or a replacement of the guide unit 17, the above-explained steps for a change of the label roll 39 are first performed, possibly with the exception of the pivoting of the optional pivot element 75. The knurled screw 87 is subsequently loosened and the guide unit 17 can be pulled off to the front and can be replaced with another guide unit.

For a change or a replacement of the printhead unit 13, the above-explained steps for a change of the thermal transfer tape roll 49 are first performed, possibly with the exception of the pivoting of the optional pivot element 75. The knurled screw 85 is subsequently loosened and the printhead unit 13 can be pulled off to the front and can be replaced with another printhead unit.

The above-explained label printer is easy to operate and can be flexibly used.

REFERENCE NUMERAL LIST

11 label printer
12 carrier tape
13 printhead unit
15 printhead
15' thermal transfer printhead
15" direct thermal printhead
17 guide unit
19 counter-element
19' print roller
19" sliding plate
21 carrier tape drawing roller
23 carrier tape pressure roller
25 transport direction 27 dispensing edge
29 angular element
31, 33 angular arm
35, 37 deflection roller
39 label roll
41 carrier tape take-up roller
44 thermal transfer tape
45 thermal transfer tape drawing roller
47 thermal transfer tape pressure roller
49 thermal transfer tape roll
51 thermal transfer tape take-up roller
53 pivot axle
55 printhead unit pivot axle
57 holding device
59 lever
61 axle
63 recess
65 pin
67 knurled screw
69 blocking pin
71 further carrier tape drawing roller
73 further carrier tape pressure roller
75 pivot element
77 further pivot axle
79 support plate
81 first receiver
83 second receiver
85 knurled screw
87 knurled screw
89 damping element
91 first motor
93 toothed belt
95 further toothed belt
97 slip clutch
99 gear
101 further slip clutch
103 second motor
105 further toothed belt
107 third motor
109 further toothed belt
111 further toothed belt
113 toothed wheel
115 toothed wheel
117 holder
119 holding arm
121 spring device
123 guide track
125 sliding block
127 tension spring
129 optical sensor
131 ultrasonic sensor
133 transport direction
135 cutout
137 plastic part
139 blocking opening

The invention claimed is:

1. A label printer for printing labels applied to a carrier tape, wherein the label printer comprises accessory parts, and wherein the label printer comprises:
a first receiver for a printhead unit comprising a printhead;
at least two mutually different printhead units that are each configured as a replaceable module and that each comprises a printhead, wherein one of the two printhead units is selectively received by the first receiver in an assembled state;
a second receiver for a guide unit for the carrier tape, wherein the guide unit comprises a counter-element to the printhead that is configured to hold the carrier tape with the labels in contact with the printhead; and
at least two mutually different guide units for the carrier tape that are each configured as a replaceable module and that each comprises a counter-element to the printhead that is configured to hold the carrier tape with the labels in contact with the printhead, wherein one of the two guide units for the carrier tape is selectively received by the second receiver in the assembled state,
wherein the guide units comprise a first guide unit and a second guide unit, wherein the counter-element of the second guide unit is different from the counter-element of the first guide unit; and
wherein the counter-element of the first guide unit is configured as a driven print roller and the counter-element of the second guide unit is configured as a sliding plate.

2. The label printer in accordance with claim 1, wherein:
each of the first receiver and the second receiver comprises a horizontally arranged holding mandrel that is fastened with a respective one end to a support, and whose other end projects from the support in a self-supporting manner;
each of the two printhead units is able to be pushed from the self-supporting end onto the first receiver; and
each of the two guide units for the carrier tape is able to be pushed from the self-supporting end onto the second receiver.

3. The label printer in accordance with claim 1, wherein the respective printhead unit is fastened to the first receiver by means of a screw that can be loosened by hand, and/or in that the respective guide unit is fastened to the second receiver by means of a screw that can be loosened by hand.

4. The label printer in accordance with claim 1, wherein the respective printhead unit can be received by the first receiver irrespectively of whether the respective guide unit for the carrier tape is already received by the second receiver; and in that the respective guide unit for the carrier tape can be received by the second receiver irrespectively of whether the respective printhead unit is already received by the first receiver.

5. The label printer in accordance with claim 1, wherein in the assembled state, the respective printhead unit is pivotably supported about the first receiver between an operating position and an insertion position for a thermal transfer tape; and/or in that, in the assembled state, the respective guide unit for the carrier tape is pivotably supported about the second receiver between an operating position and an insertion position for the carrier tape.

6. The label printer in accordance with claim 1, wherein:
the printhead units comprise a first printhead unit and a second printhead unit; and
the printhead of the second printhead unit is different from the printhead of the first printhead unit.

7. The label printer in accordance with claim 6, wherein the printhead of the first printhead unit is configured as a thermal transfer printhead; and
the printhead of the second printhead unit is configured as a direct thermal printhead.

8. The label printer in accordance with claim 1, wherein the sliding plate is metallic and/or provided with a damping element.

9. A set of mutually different accessory parts for a same label printer that is configured to print labels applied to a carrier tape, wherein the accessory parts comprise at least two printhead units and at least two guide units for the carrier tape, wherein each of the printhead units comprises a print head, wherein each of the guide units comprises a counter-element to a printhead that is configured to hold the carrier tape with the labels in contact with the printhead, wherein each of the accessory parts is configured as a replaceable module, wherein the guide units comprise a first and a second guide unit, wherein the counter-element of the second guide unit is different from the counter-element of the first guide unit; and wherein the counter-element of the first guide unit is configured as a driven print roller and the counter-element of the second guide unit is configured as a sliding plate.

10. The set of mutually different accessory parts in accordance with claim 9, wherein the printhead units comprise a first printhead unit and a second printhead unit, wherein the printhead of the second printhead unit is different from the printhead of the first printhead unit.

11. The set of mutually different accessory parts in accordance with claim 10, wherein the printhead of the first printhead unit is configured as a thermal transfer printhead and the printhead of the second printhead unit is configured as a direct thermal printhead.

12. The set of mutually different accessory parts in accordance with claim 9, wherein the sliding plate is metallic and/or provided with a damping element.

* * * * *